(12) United States Patent
Chen et al.

(10) Patent No.: US 10,364,193 B2
(45) Date of Patent: Jul. 30, 2019

(54) METHOD FOR SYNTHESIZING HIGH-PURITY ULTRAFINE ZRC—SIC COMPOSITE POWDER

(71) Applicant: SHANDONG ULTRAMING FINE CERAMICS CO., LTD., Zibo, Shandong (CN)

(72) Inventors: Daming Chen, Shandong (CN); Danyu Jiang, Shandong (CN)

(73) Assignee: SHANDONG ULTRAMING FINE CERAMICS CO., LTD., Zibo, Shandong (CN)

( * ) Notice: Subject to any disclaimer, the term of this patent is extended or adjusted under 35 U.S.C. 154(b) by 0 days.

(21) Appl. No.: 15/739,996

(22) PCT Filed: Oct. 23, 2015

(86) PCT No.: PCT/CN2015/092656
§ 371 (c)(1),
(2) Date: Dec. 27, 2017

(87) PCT Pub. No.: WO2017/016079
PCT Pub. Date: Feb. 2, 2017

(65) Prior Publication Data
US 2018/0186700 A1 Jul. 5, 2018

(30) Foreign Application Priority Data
Jul. 28, 2015 (CN) .......................... 2015 1 0452290

(51) Int. Cl.
| | | |
|---|---|---|
| *C04B 35/624* | (2006.01) | |
| *C04B 35/56* | (2006.01) | |
| *C04B 35/565* | (2006.01) | |
| *C01B 32/914* | (2017.01) | |
| *C04B 35/626* | (2006.01) | |
| *C01B 32/907* | (2017.01) | |

(52) U.S. Cl.
CPC .......... *C04B 35/624* (2013.01); *C01B 32/907* (2017.08); *C01B 32/914* (2017.08); *C04B 35/565* (2013.01); *C04B 35/5622* (2013.01); *C04B 35/6265* (2013.01); *C01P 2006/80* (2013.01); *C04B 2235/3248* (2013.01); *C04B 2235/3418* (2013.01); *C04B 2235/3826* (2013.01); *C04B 2235/3839* (2013.01); *C04B 2235/5445* (2013.01); *C04B 2235/72* (2013.01); *C04B 2235/80* (2013.01)

(58) Field of Classification Search
CPC . C04B 35/624; C04B 35/5622; C04B 35/565; C04B 38/045; C01B 32/914
See application file for complete search history.

(56) References Cited

U.S. PATENT DOCUMENTS 5,332,701 A * 7/1994 Bryson ............... C04B 35/5607
501/87

FOREIGN PATENT DOCUMENTS

CN 107721429 A * 2/2018

* cited by examiner

*Primary Examiner* — Karl E Group

(57) ABSTRACT

A method for synthesizing high-purity ultrafine ZrC—SiC composite powder is provided. The high-purity ultrafine ZrC—SiC composite powder is prepared by utilizing zirconium silicate only or zirconium silicate with one or both of zirconium oxide or silica sol as a zirconium source and a silicon source material, utilizing sucrose or glucose as a carbon source material, and utilizing acrylamide monomer and N,N'-methylene diacrylamide cross-linking agent as a gel material.

9 Claims, 1 Drawing Sheet

METHOD FOR SYNTHESIZING HIGH-PURITY ULTRAFINE ZRC—SIC COMPOSITE POWDER

CROSS REFERENCE OF RELATED APPLICATION

This is a U.S. National Stage under 35 U.S.C 371 of the International Application PCT/CN2015/092656, filed Oct. 23, 2015, which claims priority under 35 U.S.C. 119(a-d) to CN 201510452290.8, filed Jul. 28, 2015.

BACKGROUND OF THE PRESENT INVENTION

Field of Invention

The present invention relates to the field of inorganic nonmetallic materials, and more particularly to a method for synthesizing high-purity ultrafine ZrC—SiC composite powder.

Description of Related Arts

ZrC is refractory metal carbide with a high melting point of 3530° C., a high hardness of 25.5 GPa, a high thermal and electrical conductivity which is similar to metals, high chemical stability and excellent radiation resistance. High-purity ultrafine ZrC powder is widely applied in the fields of high temperature resistant structure of ceramics and anti-oxidation coatings on a spacecraft airplane; thermal radiators coatings and nuclear fuel particle coatings in nuclear industry; ultra-high temperature refractory materials and etc. In order to decrease the sintering temperature of ZrC ceramics and coatings, improve the fracture toughness and oxidation resistance thereof, or to obtain other special properties, ZrC—SiC composite powder obtained by mixing a certain amount of SiC powder and ZrC powder is needed in application. However, it is difficult to uniformly mix the SiC powder and the ZrC powder. Meanwhile, the preparation of high-purity ultrafine ZrC powder and SiC powder is highly technical.

There are many ways to synthesize ZrC powder and SiC powder, mainly including arc furnace carbothermal reduction method, self-propagating high temperature synthesis method, sol-gel method and gas phase reaction method.

Synthesizing ZrC powder is illustrated as an embodiment as follows.

At present, the industrialized production method mainly refers to electric arc furnace carbothermal reduction method. The method takes ZrSiO4 or ZrO2 as a raw material, and a proper amount of petroleum coke or graphite powder is added. Under the protection of high temperature vacuum or argon, the oxygen, silicon and carbon react to form gases of CO and SiO to be emitted by volatilization, so as to generate ZrC powder by the direct reduction and carbonization. The raw material of the technique is mature and has a low cost, and thus is suitable for industrial production. However, the ZrC powder produced by the method has a low purity and a large particle size, and thus is not capable of meeting the requirements of ultra-high temperature resistant structural ceramics and various functional coatings.

SHS (self-propagating high-temperature synthesis) is a practical technique for synthesizing ZrC powders. Under the protection of inert gas, mechanically activated mixed powder of zirconium and graphite with a proportion close to Zr:C=1:1 (slightly carbon-rich) is fired up; taking advantage of the synthesis heat during the reaction of the compounds, the reaction continues, in such a manner that ZrC powder is obtained. The key drawbacks of the technique lies in requiring to reasonably control the speed and temperature of the combustion synthesis reaction; and the advantages thereof lies in a simple technique process, energy conservation and high production efficiency. However, it is difficult to control the combustion process, the synthesized powder has large particle sizes, the particle sizes are not uniformly distributed, and the consistency between batches is poor.

Sol-gel has become a technology for preparing various kinds of ultrafine powder. The sol-gel process uses a metal alkoxide containing Zr, a carbon source material, water, alcohol and necessary catalyst to form a sol liquid. So as to form sol-wet gel by hydrolytic condensation, and then perform with drying, heat treating and grinding to obtain ultrafine ZrC powder. The advantage of the process lies in that the synthesis reaction can be achieved at a relatively low temperature, the high-purity and ultra-fine nanoscale ZrC powder can be easily prepared, and the method is suitable for the preparation of the ZrC film. However, its high cost of raw materials, complex process and low production efficiency easily lead to waste gas and wastewater pollution, sol-gel is generally suitable for laboratory research and application and is difficult for industrial production.

In recent years, a variety of gas-phase reaction methods to synthesize refractory ultra-fine powder technology are invented. For example, high purity $ZrCl_4$ and alkane gas serve as zirconium source and carbon source material, under appropriate gas protection conditions, the high purity $ZrCl_4$ and alkane gas are injected into the ultra-high temperature of about 10000K to form an ionic state, chemical reaction occurs during the cooling process to form a nano-powder of ZrC particles. $Zr(OC_4H_9)_4$ was decomposed by laser beam of high energy laser to form Zr/O/C nano-powder. Then, nano-ZrC particles are synthesized by heat treatment at 1500° C. under argon atmosphere. The advantage of this method lies in that it is capable of obtaining nanometer ultra-fine powder with good crystal state, controllable particle shape and high purity. However, due to the high equipment requirements, expensive raw materials, large energy consumption and environmental problem, the cost is high, and it is difficult for industrialized production.

In order to obtain high purity and ultrafine ZrC powder, people have improved the carbothermal reduction method. By using high purity $ZrO_2$ fine powder and graphite powder or carbon black as raw materials, which are mixed by a certain proportion and then put into a carbon tube furnace at 1600° C.-1800° C. and under the protection of inert gas to perform carbothermal reduction reaction, so as to obtain high quality ZrC powder. The advantages of this method are convenient source of raw materials, controllable production process and easy realization of industrialized production. However, since the raw materials of $ZrO_2$ powder and the graphite powder or the carbon black are all solid particles, it is very difficult to achieve complete and uniform mixing, which makes the carbothermal reduction reaction difficult to fully proceed, and the unreacted oxygen and free carbon are easily present in the powder. Therefore, the method usually needs to be carried out under higher temperatures (1600° C.-1800° C.), causing coarse particle size, increasing energy consumption and easily causing equipment damage.

Recently, people use liquid carbonaceous materials (such as phenolic resin) as carbon source materials to react with high purity $ZrO_2$ powder or zirconium oxychloride raw material to synthesize ZrC powder. The advantage of this method lies in that the carbon source and the zirconium source material can be uniformly mixed and reaction is easy to carry out. However, such resins are expensive and usually insoluble in water, which require the utilization of organic solvents. In addition, their thermal decomposition products are hard and not easily crushed. There are also reports on the use of sucrose as a carbon source for the synthesis of carbide powder. However, experiments show that, the C component of sucrose is easily foaming and loss in the thermal decomposition process, the theoretical C content is 42 wt %, but after thermal decomposition at 400° C., C yield is less than 20 wt %. Furthermore, under different conditions, C yield changes, which brings great difficulty for the exact formulation of the ratio of Zr:C.

By the process technology mentioned above, zirconium source materials are replaced by silicon source materials such as quartz, silicon metal powder, silicon dioxide fine powder, silicon tetrachloride, silica sol and etc. The process technology is suitable for synthesizing SiC powder. However, the one-step method for synthesizing highly uniform mixture of high purity ultrafine ZrC—SiC powder has not been reported.

SUMMARY OF THE PRESENT INVENTION

In view of the drawbacks in the conventional arts, an object of the present invention is to provide a method for synthesizing high-purity ultrafine ZrC—SiC composite powder, wherein the ZrC—SiC composite powder synthesized by the method can be uniformly mixed.

A method for synthesizing high-purity ultrafine ZrC—SiC composite powder is provided by the present invention. The high-purity ultrafine ZrC—SiC composite powder is prepared by utilizing zirconium silicate only or zirconium silicate with one or both of zirconium oxide or silica sol as a zirconium source and a silicon source material, utilizing sucrose or glucose as a carbon source material, and utilizing acrylamide monomer and N,N'-methylene diacrylamide cross-linking agent as a gel material.

The purity of the high-purity ultrafine ZrC—SiC composite powder of the present invention is equal to or greater than 99%, and a particle size thereof $d_{50}$ is equal to or greater than 1 μm.

Preferably, in utilizing the zirconium silicate only or the zirconium silicate with one or both of the zirconium oxide or the silica sol as the zirconium source and silicon source material, the 50% ZrC-50% SiC composite powder synthesized is capable of achieving uniformly mixing at the molecular level due to in-situ formation of $ZrSiO_4$ decomposition.

Preferably, in utilizing the zirconium silicate only or the zirconium silicate with one or both of the zirconium oxide or the silica sol as the zirconium source and silicon source material, a mole ratio of a sum of Zr and Si to C is at a range of 1:3.5-1:4. The zirconium silicate serves as the zirconium and silicon source material. The zirconium silicate can be added with an appropriate amount of $ZrO_2$ or $SiO_2$ for serving as the zirconium and silicon source material.

The method for synthesizing high-purity ultrafine ZrC—SiC composite powder, comprises following steps of:

(1) mixing the zirconium source and silicon source material and the silicon source, adding deionized water and dispersing agent and mixed grinding to obtain aqueous slurries;

(2) adding the gel material of the acrylamide monomer and the N,N'-methylene diacrylamide cross-linking agent into the aqueous slurries obtained in the step (1); mixed grinding to obtain gelation aqueous slurries;

(3) gel solidifying the aqueous slurries at a normal position;

(4) dewatering drying in an oven and performing pre-carbonizing treatment, then sending into a carbon-pipe heating furnace to perform a carbothermal reduction synthesis reaction to obtain a microcrystalline structure ZrC—SiC composite powder;

(5) grinding for dispersing and disintegrating treatment, drying to obtain the high-purity ultrafine ZrC—SiC composite powder.

Preferably, a weight of the deionized water to a weight of the carbon source material is at a range of 50%-100%; the dispersing agent is ammonium acrylate dispersing agent; wherein an adding amount of the dispersing agent is 1%-3% of a weight of the zirconium source and silicon source material.

Preferably, the acrylamide monomer and the N,N'-methylene diacrylamide is mixed according to a weight ratio at a range of 15:1-25:1. In the step (2), an adding amount of the N,N'-methylene diacrylamide cross-linking agent is 10%-20% of the weight of the deionized water in the step (1).

The mixed grinding time in the step (2) is at a range of 0.5-2 hour.

The step (3) of gel solidifying the aqueous slurries adopts one of following three steps of:

(a) adding initiating agent to the gelation aqueous slurries obtained in the step (2); and then adding a catalyst of aqueous solution of tetramethylethylenediamine or triethanolamine; mixing uniformly and waiting at a room temperature, so as to gel solidify the aqueous slurries at the normal position;

(b) adding initiating agent to the gelation aqueous slurries obtained in the step (2); heating to 60° C.-80° C. and preserving heat, so as to gel solidify the aqueous slurries at the normal position;

(c) adding aqueous solution of oxidant and reductant to the gelation aqueous slurries obtained in the step (2); wherein the oxidant and reductant is a mixture of ammonium persulfate and ammonium bisulfate which are mixed according to a weight ratio at a range of 1-2:1; mixing uniformly and waiting at a room temperature, so as to gel solidify the aqueous slurries at the normal position.

Preferably, the step (3) of gel solidifying the aqueous slurries adopts one of following three steps of:

(a') adding initiating agent of ammonium persulfate aqueous solution with a concentration at a range of 5%-20% to the gelation aqueous slurries obtained in the step (2), wherein an adding volume of the ammonium persulfate aqueous solution is at a range of 0.5-3:100 of a volume of the gelation aqueous slurries; and then adding a catalyst of aqueous solution of tetramethylethylenediamine or triethanolamine with a concentration at a range of 40-60%, wherein an adding volume of the aqueous solution of tetramethylethylenediamine or triethanolamine is at a range of 0.5-2:100 of a volume of the gelation aqueous slurries; mixing uniformly and waiting at a room temperature for 2 min-10 min, so as to gel solidify the aqueous slurries at the normal position;

(b') adding initiating agent of ammonium persulfate aqueous solution with a concentration at a range of 5%-20% or azo initiator aqueous solution with a concentration at a range of 5%-10% to the gelation aqueous slurries obtained in the step (2), wherein an adding volume of the ammonium persulfate aqueous solution or the azo initiator aqueous solution is at a range of 1-3:100 of a volume of the gelation aqueous slurries; heating to 60° C.-80° C. and preserving heat for 2 min-10 min, so as to gel solidify the aqueous slurries at the normal position;

(c') adding aqueous solution of oxidant and reductant with a concentration at a range of 10%-20% to the gelation aqueous slurries obtained in the step (2); wherein the oxidant and reductant is a mixture of ammonium persulfate and ammonium bisulfite which are mixed according to a weight ratio at a range of 1-2:1, an adding volume of the aqueous solution of oxidant and reductant is at a range of 2-4:100 of the volume of the gelation aqueous slurries; mixing uniformly and waiting at a room temperature for 2 min-10 min, so as to gel solidify the aqueous slurries at the normal position.

Preferably, the azo initiator is azobis(isobutylamidine hydrochloride) or 2,2'-Azobis[2-(2-imidazolin-2-yl)propane] dihydrochloride (AIBI).

A dewatering drying temperature in the step (4) is at a range of 100° C.-120° C.; a pre-carbonizing treatment temperature is at a range of 180° C.-220° C.

The carbothermal reduction synthesis reaction in the step (4) comprises: heating up to 1450° C.-1600° C.; preserving heat for 1 h-4 h to perform the the carbothermal reduction synthesis reaction.

The step (5) comprises: dissolving the ZrC—SiC composite powder in the step (4) with absolute ethyl alcohol; performing grinding for dispersing and disintegrating treatment by a grinder with a milling medium of polyurethane or nylon lining and WC—Co cemented carbide, so as to avoid powder surface oxidation and impurities infiltration, and drying to obtain the high-purity ultrafine ZrC—SiC composite powder.

In view of the descriptions mentioned above, the present invention has beneficial effects as follows.

(1) The present invention provides a method for synthesizing high-purity ultrafine ZrC—SiC composite powder. The present invention adopts high-purity zirconium silicate only ($ZrSiO_4$) or with appropriate amount of zirconium oxide ($ZrO_2$) or silica sol ($SiO_2$) for serving as the zirconium and silicon source; the sucrose ($C_{12}H_{22}O_{11}$) or glucose ($C_6H_{12}O_6$) for serving as the carbon source material; wherein reactive contaminants are not produced in all of them. Due to high solubility in water and little influence on the viscosity of water, both sucrose and glucose are easy to formulate high concentration of water-based slurry. In addition, the cost is low, the source is convenient to obtain, which is capable of greatly reducing the cost of raw materials. Furthermore, carbon obtained by cracking of sucrose and glucose by heating has a high purity and high reactivity and is capable of effectively improving the rate of carbothermal reduction reaction and decreasing reacting temperature, in such a manner that the sintered powder is easily grinded and refined, so the ZrC—SiC composite powder synthesized thereby is uniformly mixed.

(2) The gel solidifying of the aqueous slurries containing the acrylamide monomer and the N,N'-methylene diacrylamide cross-linking agent at a normal position is capable of avoiding the C component loss caused by foaming during the dehydration and pyrolysis process by heating the sucrose or glucose; so as to ensure that the proportion of (Zr+Si):C in the formula is accurate and constant. The newly decomposed C has a high activity and is capable of uniformly and tightly coating on surfaces of the solid-phase powder particles, so as to avoid the segregation of the raw materials during the dehydration and reaction process, effectively reduce the temperature of the carbon thermal reduction reaction to facilitate the full reaction of the carbothermal synthesis reaction.

(3) The step of dissolving the ZrC—SiC composite powder with absolute ethyl alcohol; performing grinding for dispersing and disintegrating treatment by a grinder with a milling medium of polyurethane or nylon lining and WC—Co cemented carbide, is capable of avoiding powder surface oxidation and impurities infiltration, so as to ensure the purity of the ZrC—SiC composite powder is equal to or over 99% and the particle size $d_{50} \leq 1$ μm.

DETAILED DESCRIPTION OF THE PREFERRED EMBODIMENT

Figure 1:
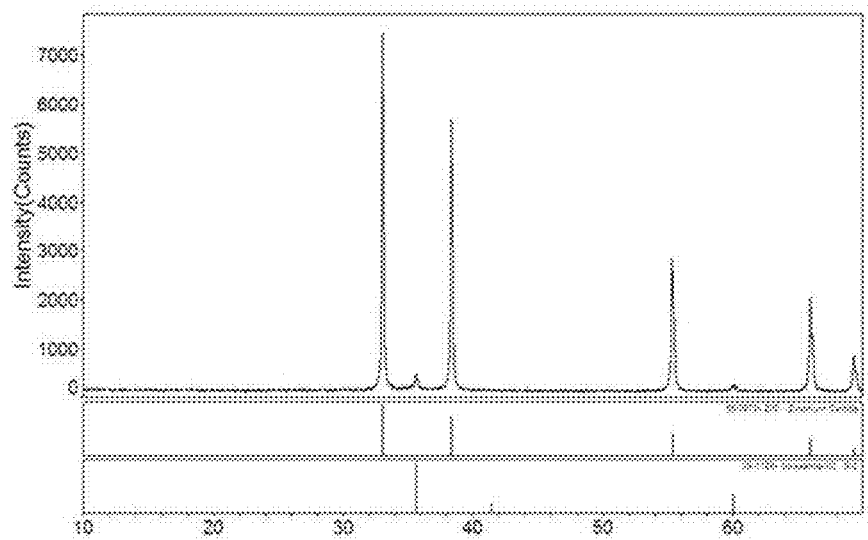
FIG. 1 is an XRD spectrogram of high-purity ultra-fine composite powder 75 mol % ZrC-25 mol % SiC which is obtained according to a preferred embodiment 2 of the present invention.

Further description of the present invention is illustrated combining with the preferred embodiments as follows.

Example 1

Synthesis of 50 mol % ZrC-50 mol % SiC Composite Powder

Accurately weigh 200 g of zirconium silicate powder and 249 g of sucrose, i.e., (Zr+Si):C=1:4, to be added to 150 ml of deionized water, add 3 ml ammonium acrylate of dispersing agent, mixedly grind for 12 hours in a roller mill to obtain aqueous slurries with a good suspension stability; add 30 g of acrylamide monomer and 1.5 g of N,N'-methylene diacrylamide cross-linking agent, continue mixed grinding for 1 hour and pour into a beaker, add 2 ml initiator of ammonium persulfate aqueous solution with a concentration of 10% drop by drop, then add 1.5 ml catalyst of tetramethylethylenediamine aqueous solution with a concentration of 50% drop by drop, stir uniformly and wait for 3 min to gel solidify at the home position; mash the wet gel into blocks, send the blocks to an oven to dry for 16 hours, then increase a temperature to 220° C. to pretreat for 8 hours, send pretreated gel to a graphite crucible, heat with a carbon-pipe heating furnace, wherein a vacuum degree maintains at 10 Pa below, increase the temperature to 1500° C. for 4 hours for a carbothermal reduction synthesis reaction to obtain ZrC—SiC powder blocks. Mix the powder blocks with 100 ml of ethanol, add into a nylon jar; add 400 g of WC—Co hard alloy abrasive media balls with a diameter of 3 mm, grind for 8 hours in a planetary mill at a rotation speed of 300 revolution per minute (rpm), take materials in the planetary mill to be put into the oven to remove a solvent of the ethanol, so as to obtain 150 g of high-purity ultrafine composite powder of 50 mol % ZrC-50 mol % SiC which has a purity of 99.4% and a particle size of $d_{50}$, wherein $d_{50} \leq 1$ μm.

Example 2

Synthesis of 75 mol % ZrC-25 mol % SiC Composite Powder

Accurately weigh 1833 g of zirconium silicate powder, 2464 g of zirconium oxide fine powder and 3993 g of sucrose, i.e., (Zr:Si:C=0.75:0.25:3.5), to be added to 2000 ml of deionized water, add 60 ml ammonium acrylate of dispersing agent, mixedly grind for 12 hours in a roller mill to obtain aqueous slurries with a good suspension stability; add 200 g of acrylamide monomer and 15 g of N,N'-methylene diacrylamide cross-linking agent, continue mixed grinding for 1 hour and pour into an enamel pot, add 15 ml of oxidant and reductant aqueous solution (ammonium persulfate:ammonium bisulfate=1.5:1), stir uniformly and wait for 5 min and the aqueous slurries gel solidify at the home position; cut the wet gel into thick sheet with a thickness equal to or below 3 mm by a zirconium-silicate ceramics knife, send to an oven to dry for 12 hours at 120° C., then increase a temperature to 180° C. to pretreat for 24 hours, send pretreated gel to a graphite crucible, heat with a carbon-pipe heating furnace under protection of argon, increase the temperature to 1600° C. for 1 hour for a carbothermal reduction synthesis reaction to a mixing grinder with a milling medium of polyurethane, add 6000 g WC—Co cemented carbide grinding medium balls with a diameter of 3 mm and 1000 g WC—Co cemented carbide grinding medium balls with a diameter of 8 mm; grind for 8 hours, take materials in the mixing grinder to be put into the oven at 80° C. to remove a solvent of the ethanol, so as to obtain 3500 g of high-purity ultrafine composite powder of 75 mol % ZrC-25 mol % SiC which has a purity of 99.2% and a particle size of $d_{50}$, wherein $d_{50} \leq 1$ μm.

Figure 2:
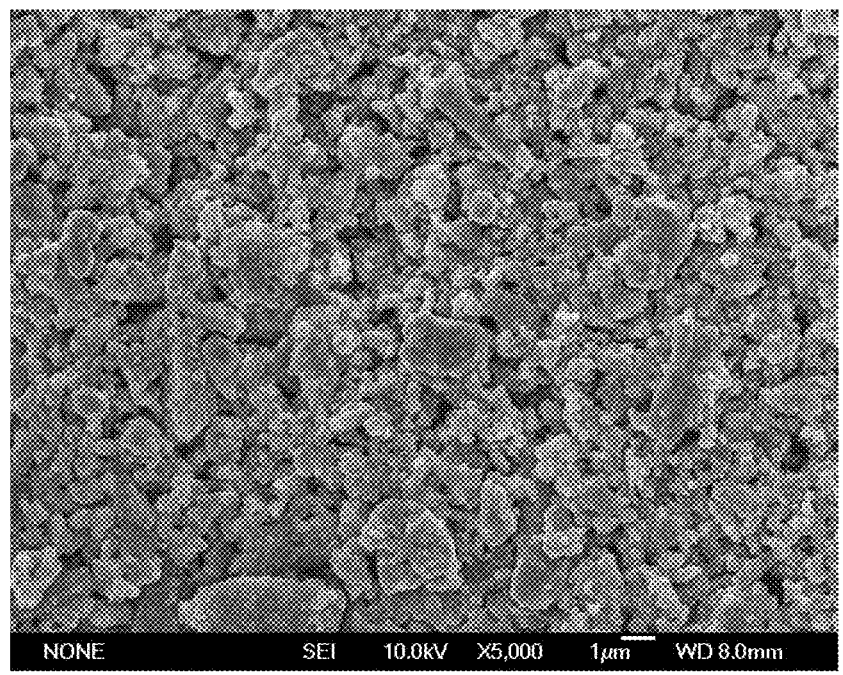
FIG. 2 is an SEM diagram of high-purity ultra-fine composite powder 75 mol % ZrC-25 mol % SiC which is obtained according to the preferred embodiment 2 of the present invention.

See FIG. 1 for an XRD spectrogram of high-purity ultra-fine composite powder 75 mol % ZrC-25 mol % SiC prepared according to the Example 2 of the present invention. See FIG. 2 for an SEM diagram.

Example 3

Synthesis of 90 mol % ZrC-10 mol % SiC Composite Powder

Accurately weigh 183.3 g of zirconium silicate fine powder and 1200 g of glucose, add 1600 g of silica sol, wherein Si:Zr:C=0.9:0.1:4, mixedly grind for 8 hours in a roller mill to obtain aqueous slurries with a good suspension stability; add 150 g of acrylamide monomer and 6 g of N,N'-methylene diacrylamide cross-linking agent, continue mixed grinding for 2 hours and pour into a enamel basin, add 10 ml of azobis(isobutylamidine hydrochloride) with a concentration of 5%, stir uniformly and keep temperature in a water bath of 70° C. for 5 min to gel solidify the aqueous slurries at the home position; mash the wet gel into blocks, send the blocks to an oven at 100° C. to dry for 16 hours, then increase a temperature to 200° C. to pre-treat for 10 hours, send pretreated gel to a graphite crucible, heat with a carbon-pipe heating furnace under protection of argon, increase the temperature to 1450° C. for 2 hours for a carbothermal reduction synthesis reaction to obtain SiC—ZrC powder; mix with 300 ml of ethanol to be put into a nylon jar with a volume of 2 L, add 800 g WC—Co cemented carbide grinding medium balls with a diameter of 3 mm to be grinded in a planetary mill with a rotary rate of 250 revolution per minute (rpm) for 8 hours, take out and put into the oven at 80° C. to remove a solvent of the ethanol, so as to obtain 460 g of high-purity ultrafine composite powder of 90 mol % ZrC-10 mol % SiC which has a purity of 99.1% and a particle size of $d_{50}$, wherein $d_{50} \leq 1$ μm.

What is claimed is:

1. A method for synthesizing high-purity ultrafine ZrC—SiC composite powder comprising steps of:
   (1) mixing zirconium source and silicon source material and the carbon source, adding deionized water and dispersing agent and mix grinding to obtain aqueous slurries; wherein the zirconium source and silicon source material is zirconium silicate only or zirconium silicate with one or both of zirconium oxide or silica sol, and the carbon source material is sucrose or glucose;
   (2) adding a gel material of the acrylamide monomer and N,N'-methylene diacrylamide cross-linking agent into the aqueous slurries obtained in the step (1); mix grinding to obtain gelation aqueous slurries;
   (3) gel solidifying the aqueous slurries in situ;
   (4) dewatering drying in an oven and performing pre-carbonizing treatment, then sending into a carbon-pipe heating furnace to perform a carbothermal reduction synthesis reaction to obtain a microcrystalline structure ZrC—SiC composite powder;
   (5) grinding for dispersing and disintegrating treatment, drying to obtain the high-purity ultrafine ZrC—SiC composite powder.

2. The method for synthesizing high-purity ultrafine ZrC—SiC composite powder, as recited in claim 1, wherein a weight of the deionized water to a weight of the carbon source material is greater than or equal to 50% and less than 100%; the dispersing agent is ammonium acrylate dispersing agent; wherein an adding amount of the dispersing agent is 1%-3% of a weight of the zirconium source and silicon source material.

3. The method for synthesizing high-purity ultrafine ZrC—SiC composite powder, as recited in claim 1, wherein the acrylamide monomer and the N,N'-methylene diacrylamide is mixed according to a weight ratio at a range of 15:1-25:1.

4. The method for synthesizing high-purity ultrafine ZrC—SiC composite powder, as recited in claim 1, wherein in the step (2), an adding amount of the N,N'-methylene diacrylamide cross-linking agent is 10%-20% of the weight of the deionized water in the step (1).

5. The method for synthesizing high-purity ultrafine ZrC—SiC composite powder, as recited in claim 1, wherein the step (3) of gel solidifying the aqueous slurries adopts one of following three steps of:
   (a) adding initiating agent to the gelation aqueous slurries obtained in the step (2); and then adding a catalyst of aqueous solution of tetramethylethylenediamine or triethanolamine; mixing uniformly and waiting at a room temperature, so as to gel solidify the aqueous slurries in situ;
   (b) adding initiating agent to the gelation aqueous slurries obtained in the step (2); heating to 60° C.-80° C. and preserving heat, so as to gel solidify the aqueous slurries in situ;
   (c) adding aqueous solution of oxidant and reductant to the gelation aqueous slurries obtained in the step (2); wherein the oxidant and reductant is a mixture of ammonium persulfate and ammonium bisulfite which are mixed according to a weight ratio at a range of 1-2:1; mixing uniformly and waiting at a room temperature, so as to gel solidify the aqueous slurries in situ.

6. The method for synthesizing high-purity ultrafine ZrC—SiC composite powder, as recited in claim 1, wherein a dewatering drying temperature in the step (4) is at a range of 100° C.-120° C.; a pre-carbonizing treatment temperature is at a range of 180° C.-220° C.

7. The method for synthesizing high-purity ultrafine ZrC—SiC composite powder, as recited in claim 1, wherein the carbothermal reduction synthesis reaction in the step (4)

comprises: heating up to 1450° C.-1600° C.; preserving heat for 1 h-4 h to perform the carbothermal reduction synthesis reaction.

8. The method for synthesizing high-purity ultrafine ZrC—SiC composite powder, as recited in claim 1, wherein the step (5) comprises: adding the ZrC—SiC composite powder in the step (4) into absolute ethyl alcohol; performing grinding for dispersing and disintegrating treatment by a grinder with a milling medium of polyurethane or nylon lining and WC—Co cemented carbide, so as to avoid powder surface oxidation and impurities infiltration, and drying to obtain the high-purity ultrafine ZrC—SiC composite powder.

9. The method for synthesizing high-purity ultrafine ZrC—SiC composite powder, as recited in claim 1, wherein a mole ratio of a sum of Zr and Si to C is at a range of 1:3.5-1:4.

* * * * *